(No Model.)

F. H. HARRIS.
VEHICLE WHEEL.

No. 371,580. Patented Oct. 18, 1887.

Witnesses:
P. M. Hulbert
T. E. Robertson

Inventor:
Frank H. Harris
By T. J. W. Robertson
Atty.

UNITED STATES PATENT OFFICE.

FRANK H. HARRIS, OF TOLEDO, OHIO.

VEHICLE-WHEEL.

SPECIFICATION forming part of Letters Patent No. 371,580, dated October 18, 1887.

Application filed June 11, 1887. Serial No. 241,008. (No model.)

*To all whom it may concern:*

Be it known that I, FRANK H. HARRIS, of Toledo, in the county of Lucas and State of Ohio, have invented new and useful Improvements in Vehicle-Wheels; and I do hereby declare that the following is a full, clear, and exact description thereof, reference being had to the accompanying drawings, which form a part of this specification.

This invention relates to certain new and useful improvements in the manner of securing rubber tires upon wheels for vehicles, more especially for that class of wheels employed in the construction of bicycles and velocipedes.

The invention consists in the peculiar construction, arrangement, and combination of the parts, all as more fully hereinafter set forth.

Figure 1:
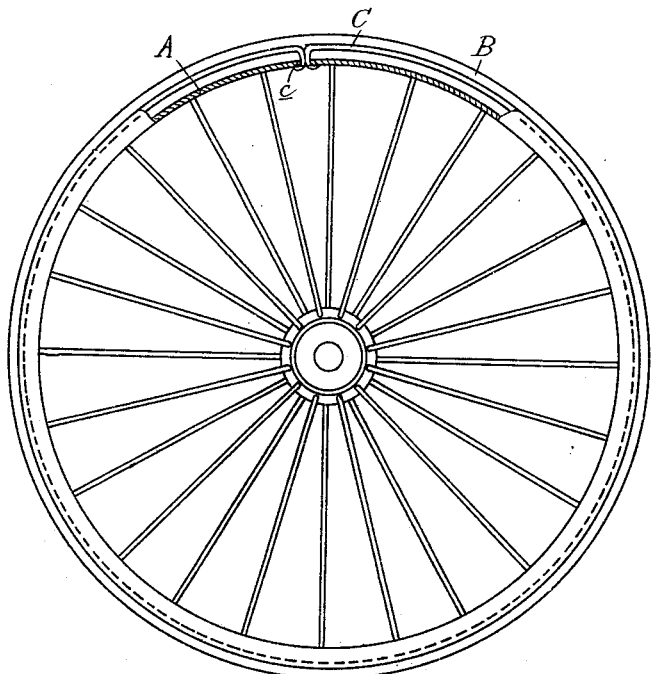
Figure 3:
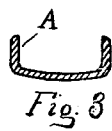
Figure 4:
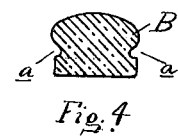
Figure 2:
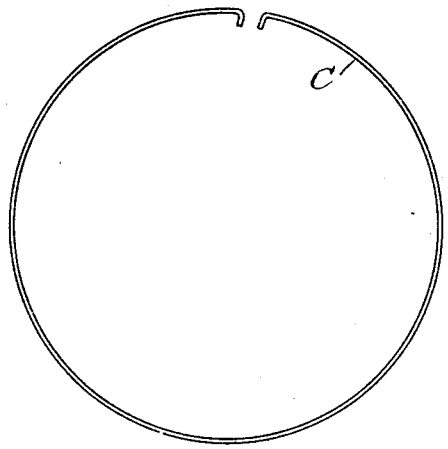
Figure 5:
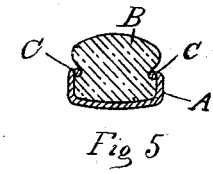

Figure 1 is a side elevation of a wheel provided with a rubber tire, partially in section, showing the manner of securing the ends of the binding-wires. Fig. 2 shows one of the binding-wires detached. Fig. 3 is a section of the rim of the wheel. Fig. 4 is a cross-section of the rubber tire. Fig. 5 is a similar view with the tire secured in place.

In the accompanying drawings, which form a part of this specification, A represents the rim of the wheel, designed to receive the rubber tire B. This rubber tire is formed with a shoulder or crease, $a$, upon each side, as shown in cross-section. To secure this tire in place within the flanges of the rim A, such tire is sprung in, as in the ordinary manner, and is bound to place by the binding-wires C, which rest upon the shoulders or creases $a$, formed on the rubber tire. These binding-wires are preferably made of coppered wire, so as to be nearly the same color as the tire. The rim of the wheel has a hole, $c$, for each binding-wire, and corresponding holes are provided for in the tire coincident with the holes $c$. One end of each binding-wire is then inserted and hooked through these holes, passed around the wheel, and then inserted with its opposite end through the same hole, when by any proper means the wire is tightened and secured by soldering the ends of the wire to the under face of the flange, as shown.

What I claim as my invention is—

The combination, with the flanged rim A of a wheel provided with holes $c$, of the elastic tire B, having recesses $a$ and seated within the flanges of said rim and provided with coincident holes, and the binding-wires C, having hooked ends, substantially as and for the purpose specified.

FRANK H. HARRIS.

Witnesses:
   H. S. SPRAGUE,
   A. BARTHEL.